US012607303B2

(12) United States Patent
Sutter et al.

(10) Patent No.: US 12,607,303 B2
(45) Date of Patent: Apr. 21, 2026

(54) AERONAUTICAL DEVICE FOR STORING LIQUEFIED GAS HAVING A COLLECTOR

(71) Applicant: ARESIA-VILLENEUVE, Villeneuve la Garenne (FR)

(72) Inventors: Xavier Sutter, Villeneuve la Garenne (FR); Jean-Christophe Bertolo, Villeneuve la Garenne (FR); Pascal Legrand, Villeneuve la Garenne (FR); Florin-Calin Paun, Villeneuve la Garenne (FR); Nicolas Walker, Villeneuve la Garenne (FR)

(73) Assignee: ARESIA-VILLENEUVE, Villeneuve la Garenne (FR)

( * ) Notice: Subject to any disclaimer, the term of this patent is extended or adjusted under 35 U.S.C. 154(b) by 64 days.

(21) Appl. No.: 18/853,773

(22) PCT Filed: Apr. 4, 2023

(86) PCT No.: PCT/FR2023/050477
§ 371 (c)(1),
(2) Date: Oct. 3, 2024

(87) PCT Pub. No.: WO2023/198976
PCT Pub. Date: Oct. 19, 2023

(65) Prior Publication Data

US 2025/0224080 A1 Jul. 10, 2025

(30) Foreign Application Priority Data

Apr. 14, 2022 (FR) ....................................... 2203467

(51) Int. Cl.
*F17C 1/12* (2006.01)
*F17C 3/04* (2006.01)
*F17C 7/02* (2006.01)

(52) U.S. Cl.
CPC .................. *F17C 7/02* (2013.01); *F17C 3/04* (2013.01); *F17C 2201/0109* (2013.01);
(Continued)

(58) Field of Classification Search
CPC ...... F17C 1/12; F17C 2270/0189; F17C 3/04; F17C 7/02; F17C 2201/0109;
(Continued)

(56) References Cited

U.S. PATENT DOCUMENTS 5,819,544 A 10/1998 Andonian
10,955,089 B2 3/2021 Oury
(Continued)

FOREIGN PATENT DOCUMENTS

WO WO 2016/112462 A1 7/2016

OTHER PUBLICATIONS

International Patent Application No. PCT/FR2023/050477 filed Apr. 4, 2023; International Search Report / Written Opinion issued Jun. 15, 2023; 14 pages, English language translation included.

*Primary Examiner* — Stephen J Castellano
(74) *Attorney, Agent, or Firm* — Mueting Raasch Group

(57) ABSTRACT

An aeronautical cryogenic tank device for storing gas, having a spherical or annular shape about an axis, comprising an inner container (26) defining a liquefied gas storage chamber (28), an outer envelope (27) containing the inner container (26), an insulation chamber (29) defined between the inner container (26) and the outer envelope (27), the reduced-pressure insulation chamber (29) having scaling equal to or better than 10-9 millibar*litre/second, a removable collector (38) passing through the outer envelope (27) and the inner container (26) in a sealed manner, the collector (38) extending over a diameter or a diagonal of the inner
(Continued)

container (26) and having a free end close to a bottom of the inner container (26), and a conduit supplied by the collector (38).

12 Claims, 6 Drawing Sheets

(52) U.S. Cl.
CPC .............................. *F17C 2203/013* (2013.01); *F17C 2203/0304* (2013.01); *F17C 2203/0629* (2013.01); *F17C 2203/0643* (2013.01); *F17C 2205/0323* (2013.01); *F17C 2221/011* (2013.01); *F17C 2221/012* (2013.01); *F17C 2221/018* (2013.01); *F17C 2221/033* (2013.01); *F17C 2223/0161* (2013.01); *F17C 2227/0157* (2013.01); *F17C 2270/0189* (2013.01)

(58) Field of Classification Search
CPC ........ F17C 2203/0304; F17C 2203/013; F17C 2203/0643
See application file for complete search history.

(56) References Cited

U.S. PATENT DOCUMENTS

| | | | | |
|---|---|---|---|---|
| 2008/0302111 | A1 | 12/2008 | Batenburg | |
| 2020/0355324 | A1 * | 11/2020 | Houel | F17C 13/001 |

* cited by examiner

AERONAUTICAL DEVICE FOR STORING LIQUEFIED GAS HAVING A COLLECTOR

This application is the § 371 U.S. National Stage Application of International Application No. PCT/FR2023/050477, filed Apr. 4, 2023, which was published on Oct. 19, 2023, as International Publication No. WO 2023/198976 A1. International Application No. PCT/FR2023/050477 claims priority French Patent Application No. FR2203467, filed Apr. 14, 2022.

The present invention relates to the aeronautical field.

Since its beginnings, aeronautics has used petrol engines with a high octane number. After 1945, the development of the jet engine and turbine led to the use of kerosene, the molecular mass of which is higher than that of petrol and the flammability of which is lower. These fuels are stored in tanks located in the wings, in the fuselage-wing connection or in the tail.

The trend towards reducing carbon dioxide gas emissions has led to engines consuming less. However, the gains on emissions of carbon dioxide gas are dwindling as certain technologies mature, in particular the speed at the end of the blade vanes. It has appeared more and more desirable to introduce a breakthrough.

Gas-aircraft projects have therefore arisen. The combustion of gases with a short or non-existent carbon chain where applicable with oxygen is little or non-polluting. On the other hand, storing $H_2$, $O_2$ or C1 or C2 gas, because of the small size of the gas molecule, is difficult and subject to risks of leaks.

On the ground, such gases are in general stored in a pressurised containers that are too heavy, are too bulky and contain too much potential pressure energy to be loaded on board an aircraft or in welded and/or adhesively bonded cryogenic tanks. Cryogenic storage of such gases is limited to a limited period proportional to the volume stored.

Moreover, hydrogen, methane, ethane, ethylene, acetylene or oxygen stored in the liquid state cannot be used by an internal or external combustion engine or a fuel cell. The end consumption requires a gaseous state.

The need has arisen to store propulsion gas in an aircraft and to extract said propulsion gas from the storage for consumption thereof on board while using aeronautical maintenance know-how and avoiding the need for new standardisation. This is because producing new standards is a lengthy and time-consuming process, giving rise to a risk of causing delays in marketing gas aircraft. Acquiring new maintenance know-how is also lengthy and expensive or even may cause reticence.

The invention proposes an aeronautical cryogenic tank device for storing gas, with a general elongate shape with rounded ends, in particular spherical or annular about an axis, comprising an inner container defining a liquefied-gas storage chamber, an outer envelope containing the inner container, an insulation chamber defined between the inner container and the outer envelope, the reduced-pressure insulation chamber having sealing equal to or better than $10^{-9}$ millibar*litre/second, a removable collector passing through the outer envelope and the inner container in a sealed manner, the collector extending over a diameter or a diagonal of the inner container and having a free end close to a bottom of the inner container, and a conduit supplied by the collector. By virtue of the invention, the cryogenic tank meets the requirements of low mass and of compactness. The cryogenic tank can supply combustible liquid or fuel in the form of liquefied gas.

In one embodiment, the device comprises a thermally insulating flexible neck forming a sealed interface between on the one hand the collector and on the other hand the outer envelope and the inner container, the neck being provided around a portion of the collector, the neck passing through the insulation chamber to enable the collector to be removed independently of the pressure in the insulation chamber. The collector is easy to remove and reinstall for rapid maintenance.

In one embodiment, the device comprises a thermally insulating stopper assembly mounted removably on the collector and accessible from outside. Maintenance is facilitated.

In one embodiment, the device comprises a support ring mounted between the inner container and the outer envelope. The construction is robust.

In one embodiment, the device comprises a connection comprising an axial concavity in the outer envelope receiving and supporting an axial projection of the inner container, and the device comprises housings supporting the outer envelope and surrounding said connections. The connection is adapted to the expansions liable to occur.

In one embodiment, the neck has an outer surface with annular chevrons. The sealing is of a high level.

In one embodiment, the neck has an undulating outer surface. The conduction path is extended.

In one embodiment, the outer envelope comprises a chassis, sealed panels, and gaskets withstanding the pressure between the chassis and the panels and/or between the panels, the chassis comprising ribs and longitudinal members. The construction is simple and repairable.

In one embodiment, the device comprises an anti-sway member inside the inner container. The mechanical behaviour, in particular the stability, of the device is improved.

In one embodiment, the device comprises a stiffener inside the inner container, preferably a strut or a tie rod. The device, in particular the inner container, can be lightened. Rigidity is increased.

In one embodiment, a hydrogen-absorbent material is disposed in the insulation chamber. A low pressure is maintained in the insulation chamber.

In one embodiment, a detector for the presence of hydrogen is installed in the insulation chamber. Exceeding a limit value can be the subject of an alarm.

In one embodiment, an assembly comprises a device as above, a temporary storage tank forming a gasification member for increasing the pressure of the gas supplied by the device, an upstream valve designed to be opened for the liquid flow during a phase of filling the temporary storage tank and closed outside the filling phase, a downstream valve being designed to be open for the gas flow during a phase of emptying the temporary storage tank and closed outside the emptying phase, the upstream valve and the downstream valve being closed during a gasification phase, the upstream valve and the downstream valve having all-or-nothing control, and a compressor disposed downstream of the downstream valve, said compressor being active at the end of the emptying phase to bring the pressure in the temporary storage tank to a value below the value of the pressure in the device, and a pressure-reducing valve disposed downstream of the downstream valve, said pressure-reducing valve being active at the start of the emptying phase to bring the pressure of the emerging gas to a value below the pressure in the temporary storage tank. The device provides the aircraft, through the volume contained in the temporary tank tanks, with the necessary autonomy independently of the state of the device. The temporary thanks can be designed for a gas pressure of several hundred bars, a selected gas pressure nevertheless being provided for the consumer members. The valves are reliable. The temporary tank can be emptied sufficiently so as to increase the quantity of gas available for the consumer members and to bring the temporary tank to a pressure at the end of emptying lower than the normal pressure in the device. The temporary tank is filled by operating a cryogenic valve under the effect of the pressure difference. Dispensing with a cryogenic pump allows a saving in mass and a reduction in the risk of accident.

In one embodiment, the temporary storage tank is designed for a service pressure above 500 bars.

in one embodiment, the device is designed for a service pressure of less than 8 bars.

Other features and advantages of the invention will emerge from the examination of the following detailed description and the accompanying drawings, on which:

Figure 1:
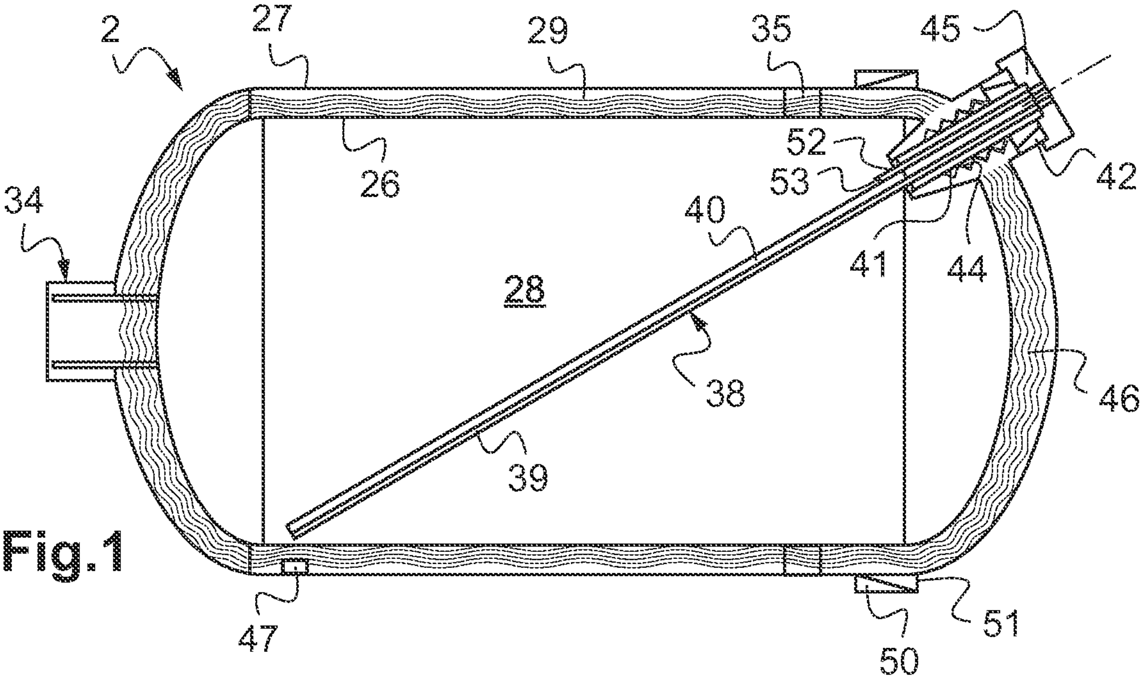
FIG. 1 illustrates schematically in axial section a device according to one aspect of the invention.

The accompanying drawings can not only serve to supplement the invention but also contribute to the definition thereof, where applicable.

The aeronautical gas-storage device is designed to be carried by an aircraft: aeroplane, drone, helicopter, etc. The aeronautical gas-storage device contains liquid and supplies gas. In other words, the gas is stored at very low temperature in liquid form in a cryogenic tank. A cryogenic tank is unsuitable for withstanding high pressures, in particular above 10 bars.

The gas stored is selected from hydrogen, methane, ethane, ethylene, acetylene and oxygen.

The Applicant intends also to take into account the fact that gasification is a rapid phenomenon even in an ambient atmosphere at −55° C. encountered at altitude. By way of embodiment, gaseous hydrogen at 0° C. and 1 atmosphere has a density approximately 800 times lower than liquid hydrogen at −253° C., and therefore with a volume approximately 800 times greater.

Aeronautical maintenance rules require it to be possible to dismantle and repair or replace the majority of parts of the aircraft. Thus an aircraft is capable of setting down in any place—aerodrome for an aeroplane, landing pad for a helicopter—adapted to its weight and its requirements for landing but not provided with maintenance equipment specific to the model of the aircraft. In the case of damage being detected, the aircraft is configured to be repaired, permanently or temporarily, or disassembled so as to replace or repair a defective component, in accordance with the manuals and documents of the constructor approved by the air safety authorities. It is desirable for the component to be easily accessible to a maintenance operator. In the case of replacement, it is desirable for the component to be as small as possible for easy handling and transport. In the case of repair, it is desirable for the components be repairable by tried and tested tools and methods normal in the aeronautical field.

An aircraft is subject to daily, weekly, etc inspections, immobilising the aircraft for a period that is the inverse of the frequency.

However, gas tanks in the terrestrial industrial field or in the space field are not subject to such requirements, and in particular are not designed for such repairability.

The Applicant has identified a storage requirement, in particular for hydrogen, methane, ethane, ethylene, acetylene or oxygen, using aeronautical cryogenic tanks carried by the aircraft and capable of supplying a combustible liquid at the outlet of the cryogenic tank.

The Applicant has identified a need for demountable aeronautical cryogenic tanks that can be inspected in accordance with aircraft inspection modes and are repairable. Furthermore, a tank is sought the useful volume/external volume ratio of which is high, and where the ratio of mass of gas contained/total mass is high, with high reliability and high safety.

As illustrated on the figures, the aeronautical gas-storage device has a general elongate shape with rounded ends. The aeronautical gas-storage device can be annular in shape about a longitudinal axis. The aeronautical gas-storage device comprises an outer envelope and an inner container. The inner container forms a liquid-gas storage chamber. The inner container is contained in the outer envelope. In general terms, the inner container and the outer envelope are distant from each other.

In the embodiment depicted, the aeronautical gas-storage device has a central part cylindrical of revolution and hemispherical ends. However, forms having exceptions to cylindricity, annularity and/or hemisphericity can be manufactured.

Each cryogenic tank is insulated to contain liquid fuel or oxidant at −253° C. Each cryogenic tank is capable of withstanding a maximum service pressure of around 6 to 10 bars.

Figure 2:
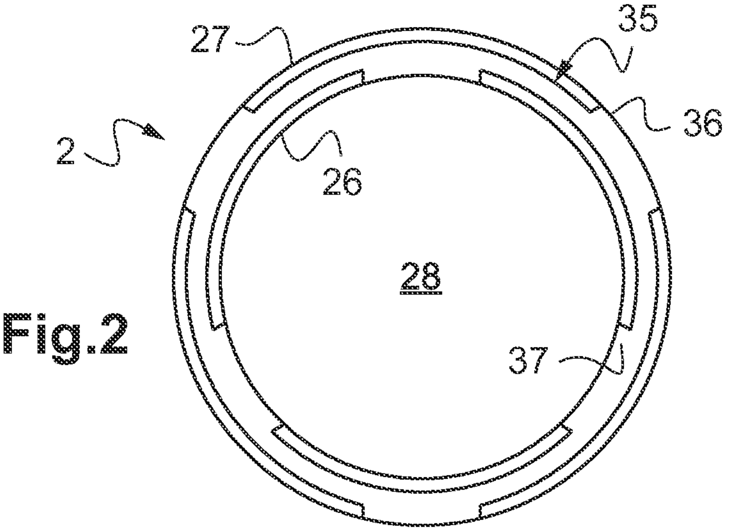
FIG. 2 illustrates schematically in cross section a device according to one aspect of the invention.
Figure 3:
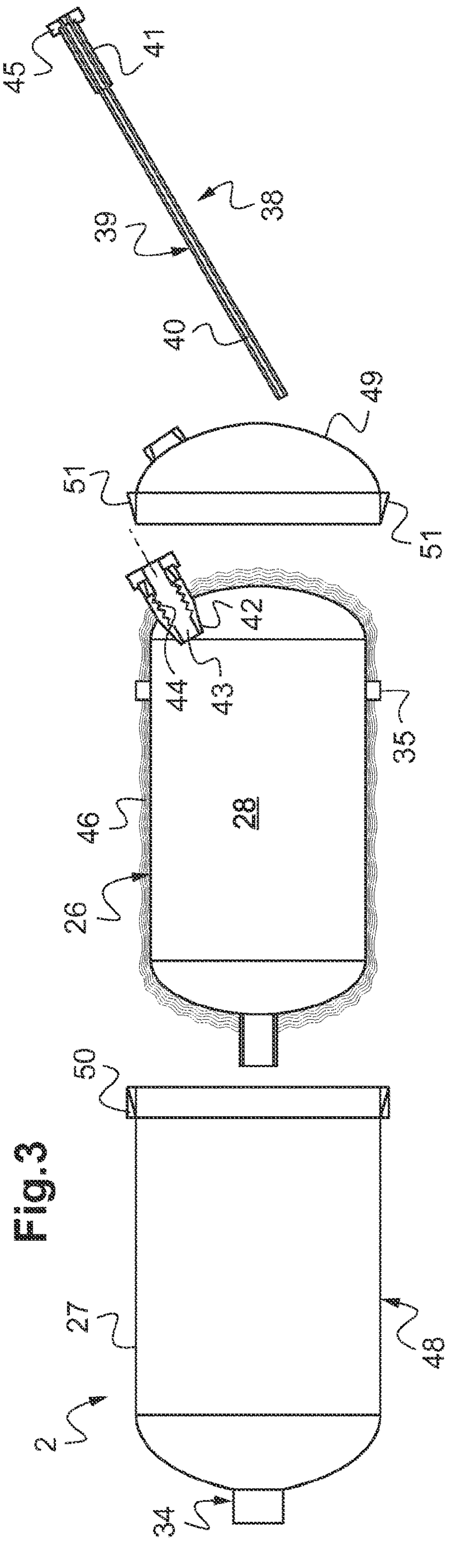
FIG. 3 illustrates schematically in side view a disassembled device according to one aspect of the invention.

In the embodiment illustrated on FIGS. 1 to 3, the cryogenic tank 2 has an elongate shape, in particular about an axis. The cryogenic tank 2 has domed ends and a central part roughly cylindrical of revolution. In a variant, the cryogenic tank 2 has a spherical shape.

The cryogenic tank 2 comprises an inner container 26 and an outer envelope 27. The inner container 26 defines a liquefied-gas storage chamber 28 for containing a load of gas at liquefaction temperature and an evaporated-gas ceiling. The inner container 26 is gastight. The inner container 26 is capable of withstanding a liquefaction temperature, for example −253° C. for hydrogen. The outer envelope 27 contains the inner container 26. The outer envelope 27 is produced in several demountable parts enabling the inner container 26 to be accessed. The outer envelope 27 protects the inner container 26 against impacts. The outer envelope 27 provides structural strength for the aeronautical gas-storage device. The outer envelope 27 is produced from material withstanding temperatures of less than −60° C. to at least +80° C.

Between the inner container 26 and the outer envelope 27, an insulation chamber 29 is defined. The insulation of the insulation table 29 is provided by a pressure that is reduced compared with atmospheric pressure. Furthermore, a solid insulating material can be disposed in the insulation chamber 29. The reduced-pressure insulation chamber 29 having impermeability to helium equal to or better than $10^{-9}$ millibar*litre/second defined between the inner container 26 and the outer envelope 27. The gastightness of the insulation table 29 encompasses gastightness with respect to the interior of the inner container 26 and gastightness with respect to the outside atmosphere.

The inner container 26 can be produced from welded metal alloy. An example of metal alloy can be Al—Cu—Li, in particular 2050 or 2099, Al—Cu, in particular 2219, stainless steel, in particular 304, 304L, 316, 316L. The inner container 26 has an elongate shape with two domed ends surrounding a body. The body can be cylindrical. The body can be of revolution.

The outer envelope 27 comprises a chassis 30, gastight panels 31, gaskets withstanding the pressure between the chassis 30 and the panels 31 and/or between the panels 31. The panel 31 can be assembled on the chassis 30 by screwing.

The chassis 30 comprises ribs 32 and longitudinal members 33. The ribs 32 can have a closed contour, for example annular. The longitudinal members 33 extend longitudinally. The longitudinal members 33 join at the ends of the outer envelope 27.

The outer envelope 27 comprises an assembly of panels 31. The panels 31 are produced from welded metal alloy or from composite materials. An example of composite materials can be epoxy resin with carbon fibres, Kevlar fibres and/or glass fibres. An example of metal alloy can be Al—Mg, in particular 5086, Al—Mg—Si, in particular 6061, Al—Cu—Li, in particular 2195.

Between the panels 31 and the chassis 30, gaskets are provided. The gaskets can be metal/metal or made from synthetic material, for example from elastomer. In the case of gaskets made from synthetic material, grooves are provided in the panels 31 or in the chassis 30 to house said gaskets. In the free state, the gaskets project beyond the grooves by a height of less than 10% of a height of said gaskets. Height means the diameter for an O-ring seal.

The cryogenic tank 2 comprises two connections between the outer envelope 27 and the inner container 26 to support the inner container 26. The connections are configured for very low thermal conduction.

At least one of the connections is of the sliding type, making it possible to accommodate the differential expansion of the outer envelope 27 and inner container 26. The connections are carried by the outer envelope 27. A first of the connections is at the end. The end connection 34 can comprise a central projection at one end of the inner container 26 cooperating with an axial concavity of the outer envelope 27 forming a housing for the protuberance with axial sliding over a travel of a few millimetres so that the contraction of the inner container 26 on filling with a liquefied gas and the expansion of the inner container 26 after emptying of the liquefied gas is free. The end connection 34 is configured to have a thermal conduction path of great length.

The second connection is located at a distance from the end opposite to the first connection. The second connection surrounds the inner container 26. The second connection is mounted in the insulation chamber 29. The second connection comprises a support ring 35. The supporting 35 is mounted between the inner container 26 and the outer envelope 27. The support ring 35 is mounted at a distance from the connections in the insulation chamber 29.

The support ring 35 comprises external sectors 36 projecting radially outwards. The external sectors 36 have a peripheral surface in contact with the bore of the outer envelope 27. The external sectors 36 occupy an angle of the order of 15 to 40°.

The support ring 35 comprises internal sectors 37 projecting radially inwards. The internal sectors 37 are here three in number. The internal sectors 37 have a convex surface in contact with the periphery of the inner container 26. The internal sectors 37 occupy an angle of the order of 15 to 40°. The external sectors 36 and the internal sectors 37 alternate. The external sectors 36 and the internal sectors 37 are angularly distant from each other. Preferably, three internal sectors 37 and three external sectors 36 of approximately 20 to 30° are alternately distributed and separated by zones with no projection and occupying an angle of approximately 40 to 30° respectively. The support ring 35 is held by sufficient friction against the inner container 26 or by permanent securing.

The support ring 35 is produced from composite material with low thermal conduction and high mechanical strength.

The cryogenic tank 2 comprises a removable collector 38 passing through the outer envelope 27 and the inner container 26 sealingly. The collector 38 comprises a straight tube 39 for taking off liquefied gas in the inner container 26. The tube 39 is produced from insulating material. The collector 38 comprises a first opening inside the inner container 26. The collector 38 comprises a second opening outside the outer envelope 27. The second end is designed to be connected to a conduit, for example an outlet conduit 4, cf. FIG. 6. The first and second ends are connected by an aperture. The first end, in the mounted state, is located in proximity to the bottom of the inner container 26. The first end is free. Thus the collector 38 draws off liquefied gas. The drawing off is stopped when the level of the liquid is low. In other words, the inner container 26, in operation, contains a gaseous phase and a liquid phase. At the end of filling, the liquid phase is maximum and the gaseous phase is at a minimum. At the end of drawing off, the liquid phase is at a minimum, or even absent, and the gaseous phase is maximum. The liquid phase is drawn off. Drawing off the liquid phase with respect to the gaseous phase allows conduits with an appreciably smaller diameter. The compactness of the members downstream of the cryogenic tank 2 is improved. The tube 39 also serves for filling with liquefied gas.

The collector 38 comprises, at the second end, a plug 41 surrounding the tube 39. The plug 41 is produced from insulating material. The plug 41 projects outside the outer envelope 27. The plug 41 can have a gripping zone for dismantling, for example in maintenance. The plug 41 has an outside diameter greater than the diameter of the tube 39. The plug 41 forms a demountable gastight head of the cryogenic tank 2.

A stopper assembly comprises the stopper plug 41 and a stopper cap 45. In the case of an appliance of the aeroplane on drone type, the cryogenic tank 2 can be mounted with the stopper oriented towards the front of the appliance and the free end of the tube 39 towards the rear of the appliance to take advantage of the general inclination of the appliance by a few degrees, allowing more complete filling with liquefied gas and more complete drawing off of the liquefied gas. The cryogenic tank 2 can also be mounted inclined, in particular by means of a support member with unequal height between the front and rear of the cryogenic tank 2.

Furthermore, the collector 38 comprises a liquid-level gauge 40. The gauge 40 extends along the tube 39. The gauge 40 is connected to the outside of the tank by cable communication passing through the plug 41. The gauge 40 provides as an output a signal representing the liquid level. The gauge can be capacitive. The precision of the gauge is higher, the lower the angle that the collector 38 makes with respect to the horizontal. This is because, for a given resolution of the gauge and a given height of the inner container 26, an increased length of the inner container 26 allows an increased length of the gauge and therefore increased precision. For example, a gauge at 30° with respect to the horizontal has its precision doubled compared with a vertical gauge.

The collector 38 comprises a gas vent 53 for rapid discharge in the case of overpressure. The vent 53 also serves during filling to discharge the gases to avoid overpressure. The vent 53 serves, during drawing off, for repressurisation by introducing gas if required. The vent 53 is disposed in the plug 41 and emerges in the inner container 26 in proximity to the plug 41. The vent 53 is provided with a liquid non-return valve.

The vent 53 is disposed in the plug 41 and emerges in the inner container 26 in proximity to the plug 41. Thus the vent 53 is connected to the gas ceiling of the inner container 26. The vent 53 is connected to a pipe passing through the plug 41. A valve with an opening pressure lower than the pressure allowable by the cryogenic tank 2 can be connected to the pipe. A rupture disc with a rupture pressure below the pressure allowable by the cryogenic tank 2 can be connected to the pipe. The valve and the rupture disc are mounted in parallel.

The collector 38 comprises a temperature sensor disposed in the bottom of the plug 41 on the inside. The temperature sensor provides temperature information measured in the inner container 26.

The cryogenic tank 2 comprises a thermally insulating neck 42. The neck 42 has a bore. The neck 42 can be produced from metal. The metal is selected so as to have low thermal conductivity and to be mechanically strong, flexible and impervious to hydrogen. The neck 42 is welded or screwed with a gasket to the inner container 26. The neck 42 is welded or screwed with a gasket to the outer envelope 27. The neck 42 is sufficiently flexible to accommodate differences in expansion between the inner receptacle and the outer envelope 27. The neck 42 comprises an external wall secured to the inner container 26 and to the outer envelope 27. The neck 42 comprises an interior wall distant from the inner container 26 and from the outer envelope 27. The interior wall can be secured to the external wall at the ends of the neck 42.

The external wall is tubular. The internal wall is tubular in the form of bellows. The interior wall can be produced from metal sheet with a thickness less than the metal sheet of the external wall to increase the elastic deformability. The interior wall can have a bellows shape, which increases suitability for elastic deformation. A bellows shape, for example undulating, reduces the contact surface between the interior wall and the plug 41, giving rise to low thermal conduction.

Advantageously, the bellows-type interior wall comprises two concentric metal sheets. Said metal sheets are fitted one in the other and connected at the ends. In this way a double wall is formed, reducing the risk of leakage. In the event of piercing of one of the two metal sheets, detection can be made by applying between the two sheets a gas pressure higher than the pressure in the insulation chamber and lower than atmospheric pressure and by monitoring the change in the pressure applied. If said applied pressure decreases, the metal sheet with the larger diameter has a leak with the insulation chamber. If said applied pressure increases, the metal sheet with a smaller diameter has a leak with the bore of the neck 42. The neck can then be changed. In addition, if only one of the metal sheets has a leak, the insulation chamber keeps its low pressure, ensuring low thermal conduction, and the cryogenic tank 2 is operational until the next maintenance operation. In the case of a single metal sheet losing its seal, the insulation chamber loses its low thermal conduction property and the cryogenic tank 2 is emptied as an emergency with loss of its content.

The neck 42 forms a gastight interface with the collector 34 on the one hand and on the other hand the outer envelope 27 and the inner container 26. The neck 42 maintains gastightness between the outer envelope 37 and the inner container 26, whatever the position of the collector 38, or even in the absence thereof. The neck 42 is sealingly attached in a piercing provided in the outer envelope 27. The neck 42 is sealingly attached in a piercing provided in the inner container 26. The piercing in the outer envelope 27 and the piercing in the inner container 26 are provided at one of the rounded ends of the cryogenic tank 2 in proximity to the outside diameter of the cryogenic tank 2 at the top part. The collector 38 extends beyond the neck 42 towards the outside by an external end. The collector 38 extends beyond the neck 42 towards the inside of the cryogenic tank 2 downwards and towards the other one of the rounded ends of the cryogenic tank 2.

The neck 42 is provided around a portion of the collector 38. The neck 42 passes through the insulation chamber 29 to enable the collector 38 to be demounted independently of the pressure in the insulation chamber 29. The neck 42 is provided with a through hole 43 in which the plug 41 of the collector 38 is installed demountably. The contact surface between the neck 42 and the plug 41 can be provided with a female annular set of teeth 44 to increase the length of a leakage path and to favour the mechanical holding of the collector 38 in the neck. Here the set of teeth 44 has chevrons. The plug 41 has in the free state a smooth external surface of revolution. The plug 41 is adapted to the neck 42. A slight clearance between the bellows and the plug 41 can be provided. A deflector for liquid is provided inside the neck in proximity to the storage chamber 28. The plug 41 is produced from thermally insulating material. The plug 41 can comprise a strong shell and an insulating synthetic foam in the shell.

Figure 6:
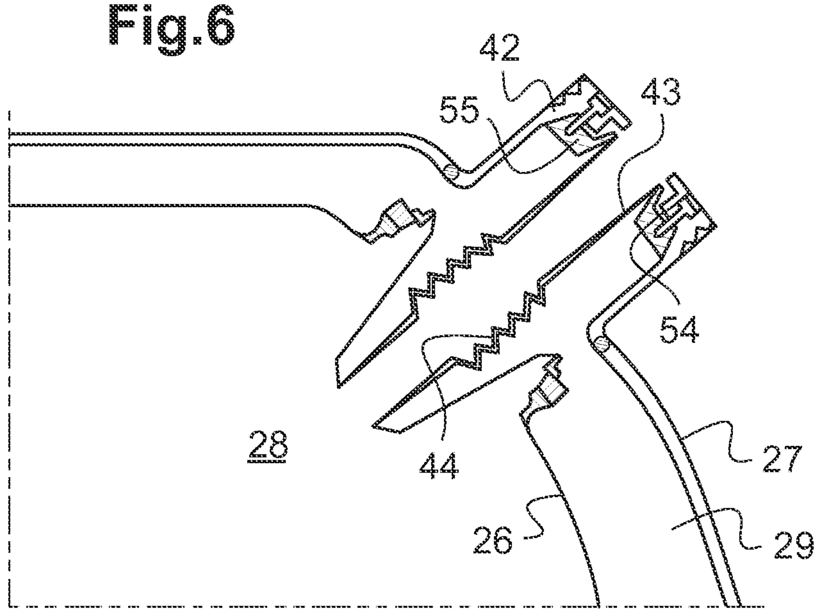
FIG. 6 illustrates schematically in cross section a neck according to one aspect of the invention.
Figure 7:
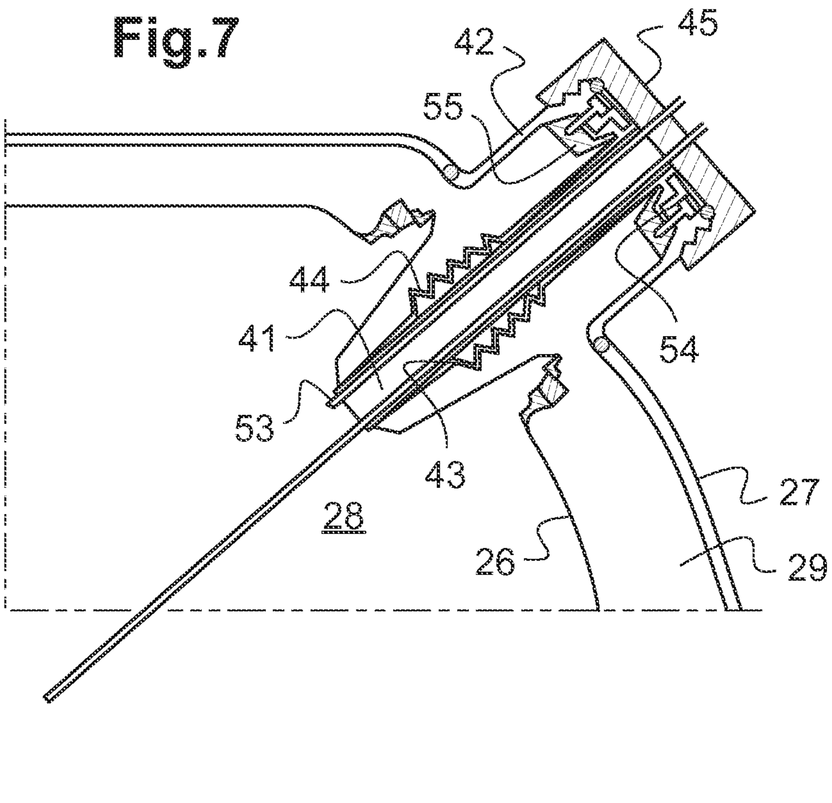
FIG. 7 illustrates schematically in cross section a neck and a collector according to one aspect of the invention.
Figure 8:
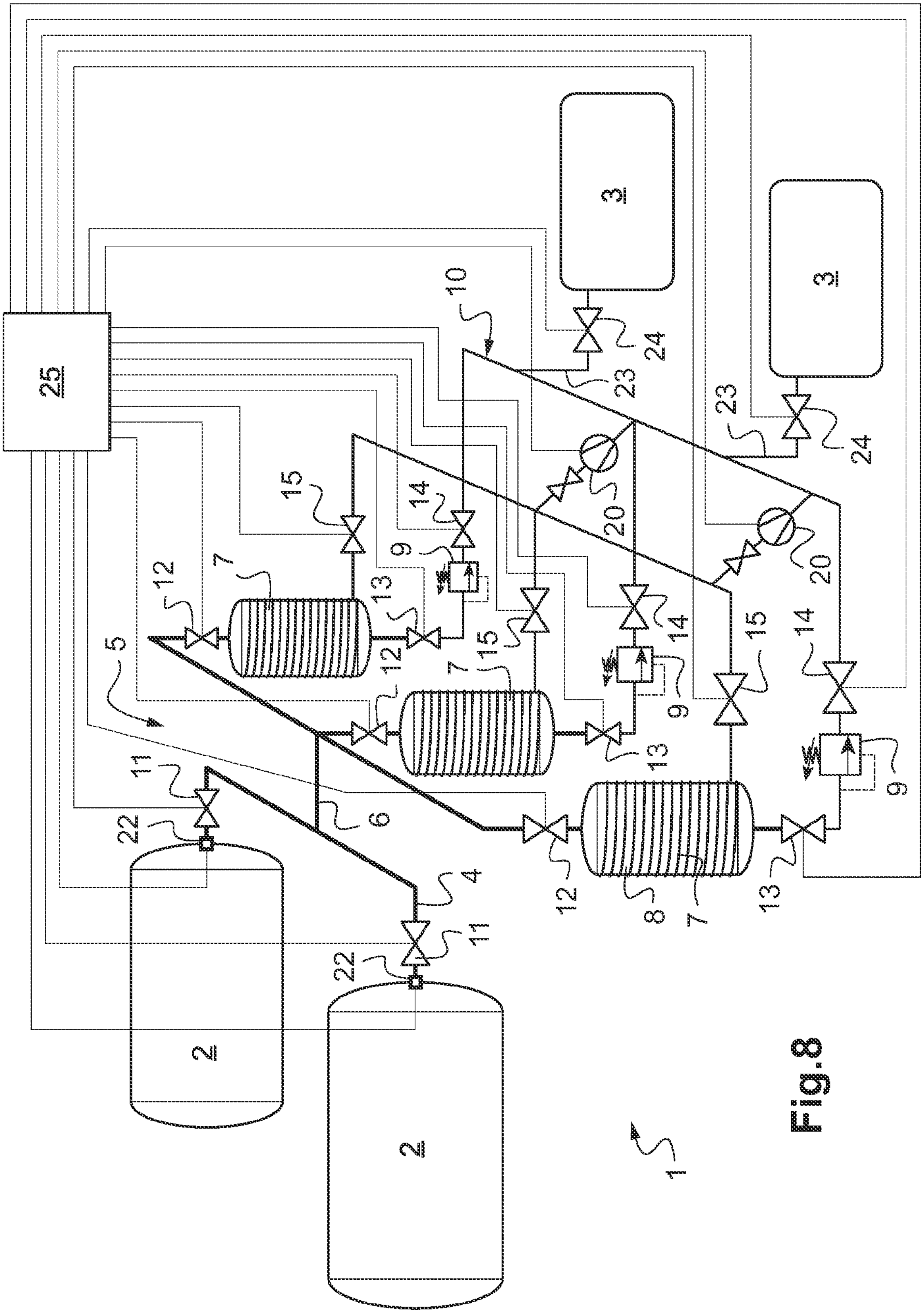
FIG. 8 illustrates schematically in perspective an assembly according to one aspect of the invention.

In the embodiment in FIGS. 6 and 7, the neck 42 is welded to the inner container 26 around its external wall. The neck 42 has a flange superimposed on a flange of the inner container 26. The welding can be done by electron beam directed towards the flanges. The neck 42 is welded to the outer envelope 27 around its external wall at a distance from the weld to the inner container 26. The external wall of the neck 42 comprises two distinct and separate parts, one connected to the inner container 26 and the other connected to the outer envelope 27.

The interior wall connects the two parts of the exterior wall. The interior wall comprises two concentric metal sheets with a thickness of between 0.1 and 0.2 mm. Towards the outside, the neck 42 comprises a collar 54 directed towards the interior wall. The collar 54 sealingly connects the interior wall and the exterior wall. A gasket 55 is attached to the collar 54, in particular by screwing. The gasket 55 comes into contact with the plug 41 of the collector 38. Here the level gauge is absent.

The cryogenic tank 2 comprises a cap 45 permanently mounted on the collector 38 and accessible from the outside.

The cap 45 is secured to the tube 39 by screws or bolts. The cap 45 is disposed outside the outer envelope 27. The cap 45 is disposed at said external end of the collector 38. The cap 45 is gastight.

The cryogenic tank 2 is designed for a service pressure of less than 8 bars, in particular 6 bars.

Advantageously, the cryogenic tank 2 comprises an anti-sway member installed inside the inner container 26. The anti-sway member comprises one or more perforated panels separating the interior volume of the inner container 26 into several zones. The apertures in the perforated panels can have a surface area of around 1 to 5% of the surface area of the perforated panels. The perforated panels can be longitudinal or transverse. The perforated panels reduce the speed of movement of the liquefied gas in the inner container 26 during accelerations, for example at takeoff or landing or during atmospheric turbulence.

Advantageously, the cryogenic tank 2 comprises a stiffener inside the inner container 26. The stiffener comprises at least one strut or tie rod connecting opposite regions of the inner container 26. The stiffener makes it possible to lighten the rest of the structure of the inner container 26.

In the insulation chamber 29, a hydrogen-absorbent material 46 is installed, for example a nanoporous material. In the event of a slight leak, the loss of insulation related to the increase in pressure in the insulation chamber 29 is reduced. After such a leak, the outer envelope 27 is disassembled to open the insulation chamber 29 and the hydrogen-absorbent material 46 is removed to desorb the hydrogen, for example by heating.

A hydrogen-presence detector 47 is installed in the insulation chamber 29. The presence of hydrogen is monitored. In the case of a strong leak, it is possible to demand the emergency emptying of the inner container 26. In the case of a slight leak, it is possible to bring a maintenance operation forward. The maintenance operation can comprise the repair of the inner container 26 to remedy the leak, the replacement or desorption of the hydrogen-absorbent material, where applicable, and the re-emptying of the insulation chamber 29.

In the embodiment illustrated on FIGS. 1 to 3, the outer envelope 27 comprises two separable parts 48 and 49. A first part 48 comprises an end and a body. A second part 49 comprises an opposite end. The first and second parts are connected sealingly and separably by two sealing rings 50 and 51 offering metal/metal sealing surfaces by interference. The interference can be cone to cone, torus to cone, or surface to surface with where applicable an O-ring seal made from metal mounted hot—in particular made from copper alloy—or from elastomer. The interference is provided by axial clamping, in particular by bolts. The sealing rings 50 and 51 are annular.

Figure 4:
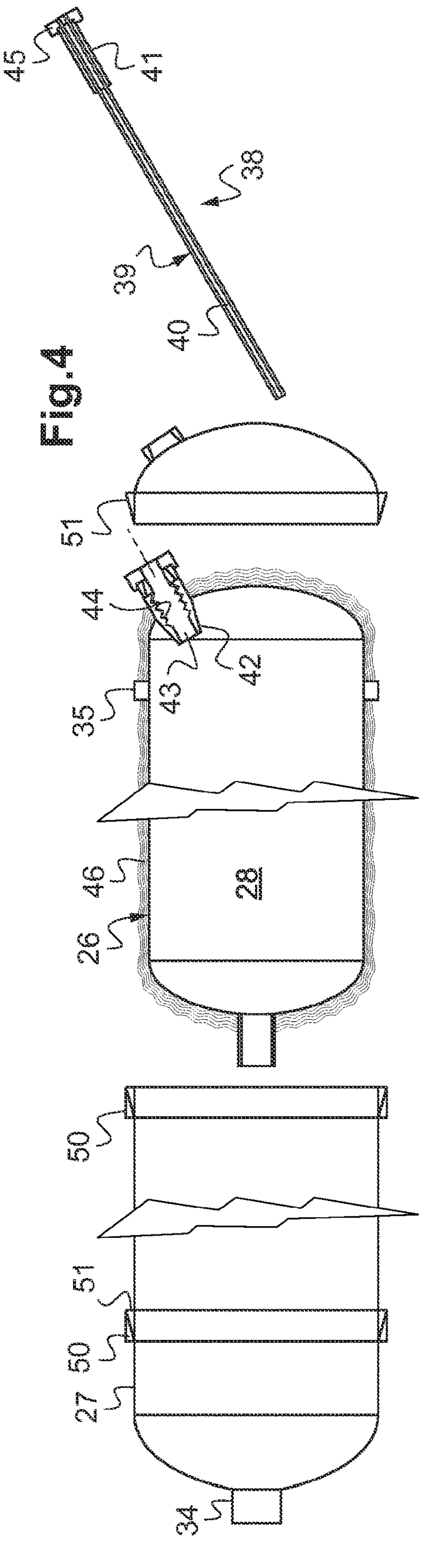
FIG. 4 illustrates schematically in side view a disassembled device according to another aspect of the invention.

In the embodiment illustrated on FIG. 4, the outer envelope 27 is produced in several portions. Two portions are connected sealingly by sealing rings 50 and 51 as described above. Portions can be standardised for various capacities of the inner container 26 with an end portion, one or more central portions, and an end portion provided with the piercing for the neck. Several support rings 35 can be provided.

Figure 5:
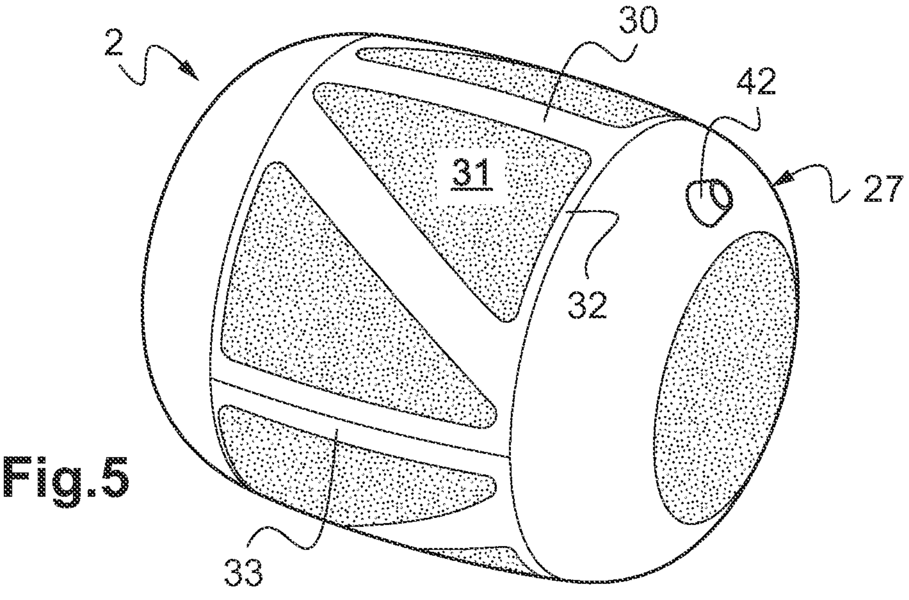
FIG. 5 illustrates schematically in perspective a device according to another aspect of the invention.

In the embodiment illustrated on FIG. 5, the chassis 30 of the outer envelope 27 comprises annular ribs 32, longitudinal members 33 parallel to the longitudinal axis and diagonal struts. The outer envelope 27 comprises panels 31 roughly triangular in shape, each mounted between a rib, a longitudinal member and a strut, and panels domed at the ends. The triangular panels 31 leave the chassis 30 visible. The domed panels cover the chassis 30 beyond the ribs 32.

In the embodiment illustrated on FIG. 6, the distribution circuit 1 comprises a first valve 11 for each cryogenic tank 2. The first valve 11 is mounted on the outlet conduit 4. The first valves 11 are controlled with an open position and a closed position. The intermediate positions of the first valves 11 are dynamic in that the first valves 11 are in movement while passing through said intermediate positions. In other words, the first valves 11 are of the all-or-nothing type. The first valves 11 can be disposed immediately downstream of the flow meters 22.

The first valves 11 emerge in a cryogenic distributor 5. The cryogenic distributor 5 can comprise a common conduit 6 connecting the outlets of the first valves 11. The distributor is cryogenic in that it passes liquid fuel/oxidant.

The cryogenic distributor 5 comprises a plurality of outlets, here three. On each of said outlets second valves 12 are mounted. The second valves 12 are controlled with an open position and a closed position. The intermediate positions of the second valves 12 are dynamic in that the second valves 12 are in movement while passing through said intermediate positions. In other words, the second valves 12 are of the all-or-nothing type. The second valves 12 are here three in number.

Downstream of each second valve 12 a central temporary storage tank 7 is mounted. Three temporary storage tanks 7 are provided in this embodiment. Each temporary storage tank 7 also serves as a gasifier. Insulation can be avoided. Each temporary storage tank 7 receives liquid and supplies gas downstream. A pressure rise or gasification step takes place in each temporary storage tank 7 between filling and emptying. Each temporary storage tank 7 is capable of withstanding a maximum service pressure of the order of 300 to 1000 bars. Each temporary storage tank 7 is designed to operate in a temperature range from −253° C. to +60° C. The temporary storage tanks 7 are two-phase over some of the operating steps and gaseous single-phase over the other operating steps. Each temporary storage tank 7 can be equipped with a heating member 8.

Downstream of each temporary storage tank 7 a third valve 13 is installed for supplying gas and a pressure-reducing valve 9 downstream of the third valve 13. The pressure-reducing valve 9 clips the pressure to supply gas at a consumption pressure fixed by the manufacturer of the consumer member 3. The pressure-reducing valve 9 is active when the pressure in the temporary storage tank is higher than the consumption pressure and inactive otherwise. The consumption pressure is lower than the maximum pressure of the temporary storage tank 7. The consumption pressure is independent of the maximum pressure of the cryogenic tanks. The third valves 18 are of the all-or-nothing type.

Downstream of each pressure-reducing valve 9, a controlled fourth valve 14 can be provided. The fourth valves 14 are of the all-or-nothing type.

The fourth valves 14 or the pressure-reducing valves 9, depending on the option selected, emerge in a collector 10. The collector 10 can comprise a conduit connecting the outlets of the fourth valves 14 or of the pressure-reducing valves 9. The collector 10 passes gas. The collector 10 is connected towards downstream to conduits 23 supplying to the consumer members 3. In general, one supply conduit 23 is provided for each consumer member 3. Each supply conduit 23 can be equipped with a controlled supply valve 24. The supply valve 24 has a variable flow rate.

The distribution circuit 1 comprises at least one compressor 20 connected to the collector 10. In general, two compressors 20 are provided in parallel for redundancy. The compressor 20 is electrical. The compressor 20 can be equipped with a controlled upstream valve. The compressor 20 discharges gas into the collector 10. In particular, the collector 10 consists of a conduit in the case of a single consumer member 3.

Downstream of each temporary storage tank 7 a fifth valve 15 is installed for supplying gas and a second collector downstream of the fifth valves 15. The second collector is connected to the compressor 20. The fifth valves 15 make it possible to isolate the temporary storage tanks 7 and the compressor 20. The fifth valves 15 are controlled. The fifth valves 15 are of the all-or-nothing type.

The compressor 20 increases the pressure to supply gas at a pressure equal to a consumption pressure fixed by the manufacturer of the consumer member 3. The consumption pressure is lower than the maximum pressure in the temporary storage tank 7. The compressor 20 makes it possible to take off gas from a temporary storage tank 7 the pressure of which is lower than the consumption pressure to supply the collector 10 and the consumer members 3. More complete emptying of the temporary storage tank 7 makes it possible to increase the range supplied by the gas contained in the temporary storage tank 7 or to reduce the volume of the temporary storage tank 7.

Emptying the temporary storage tank 7 sufficiently to bring the internal pressure of the temporary storage tank 7 to a value lower than the pressure in one of the cryogenic tanks makes it possible, during filling following the emptying, to transfer the liquid from the cryogenic tank to the temporary storage tank 7 by pressure difference. Thus the liquid in the cryogenic tank is sucked by the temporary storage tank 7 to pressure equilibrium. A cryogenic pump can be dispensed with, giving a saving in mass and energy consumed.

The distribution circuit 1 offers a combination of individual states of each cryogenic tank, of each temporary storage tank 7 and of each consumer member 3. Several consumer members 3 can be active simultaneously. In normal mode, a cryogenic tank is being emptied while the others are inactive and therefore closed. However, in some situations, for example to reduce the pressure in several cryogenic tanks, a particular mode can be provided in which several cryogenic tanks are being emptied. The temporary storage tanks 7 have a filling mode, a gasification mode, a gas storage mode and an emptying mode.

When one of the cryogenic tanks is being emptied, the corresponding first valve is open and the other first valves 11 are closed. When one of the consumer members 3 is being supplied, the corresponding supply valve 24 is open.

When one of the temporary storage tanks 7 is in filling mode, the second valve 12 connected to said temporary storage tank 7 is open and at least one of the first valves 11 is open. The other second valves 12 are closed except in the case where simultaneous filling of two temporary storage tanks 7 is being implemented. The third valve 13 connected to said temporary storage tank 7 is closed. The fifth valve connected to said temporary storage tank 7 is closed.

When one of the temporary storage tanks 7 is in gasification mode, the second valve 12 connected to said temporary storage tank 7, the third valve 13 connected to said temporary storage tank 7 and the fifth valve 15 connected to said temporary storage tank 7 are closed. Gasification mode is of short duration, in particular in the case of hot ambient atmosphere and/or of heating of the temporary storage tank 7.

When one of the temporary storage tanks 7 is in emptying mode, the second valve 12 connected to said temporary storage tank 7 is closed. In the first part of emptying, the pressure in the temporary storage tank 7 is higher than the consumption pressure. The third valve 13 connected to said temporary storage tank 7 is open, the corresponding fourth valve 14 is open and the fifth valve connected to said temporary storage tank 7 is closed. The gas undergoes a reduction in pressure in the pressure-reducing valve 9 and is supplied to the collector 10 at the consumption pressure. The gas is next consumed by the consumer member or members 3.

At a given instant, among three temporary storage tanks 7, one is in filling mode, another in gasification and storage mode and the third in emptying mode. As the modes have different durations, it is also possible to find two temporary storage tanks 7 in filling mode and the third in emptying mode or vice versa. It is also possible to find two temporary storage tanks 7 in storage mode and the third in emptying mode or vice versa.

In the embodiment, a flow meter 22 is disposed at the outlet of each liquid fuel/oxidant source 2. The flow meters 22 make it possible to know, with sufficient precision, the quantity of liquid supplied to such a temporary storage tank 7.

In the embodiment, the distribution circuit 1 comprises a control unit 25 receiving an external command, for example coming from the consumer members 3 external to the aeronautical storage device or from a central control unit of the aircraft, and liquid flow rate data coming from the flow meters 22. The control unit 25 generates and sends commands to said first, second, third, fourth and fifth controlled valves and to the controlled supply valves 24. The commands can be “open” or “closed”. The control unit 25 manages said combination of individual states.

In a variant, the first valves 11 can be replaced by at least one multiway valve having several inlets and one outlet. In this case, it is advantageous to provide a multiway valve with mixed positions, in particular at least one position of simultaneous emptying of two or more cryogenic tanks 2 to reduce the pressure thereof while avoiding loss into the atmosphere.

In a variant, the second valves 12 can be replaced by at least one multiway valve having one inlet and several outlets, one per temporary storage tank 7. Said multiway valve forms a distributor.

In a variant, the pressure-reducing valves 9 are replaced by a single pressure-reducing valve 9, the third valves 13 emerging in the single pressure-reducing valve 9. In this case, the third valves 13 can be replaced by at least one multiway valve having several inlets and one outlet to the pressure-reducing valve. The fourth valves 14 are then replaced by a single fourth valve 14, where applicable non-controlled.

In a variant, the fifth valves 15 can be replaced by at least one multiway valve having several inlets, one per temporary storage tank 7, and an outlet to the compressor 20 or compressors 20. Said multiway valve forms a collector 10.

The cryogenic tanks 2 being subject to evaporation from the liquid, a gas-collection circuit can be provided in a top part of the cryogenic tanks 2. The collection circuit can be active above a threshold pressure through a calibrated-pressure valve. The collection circuit comprises a compressor for reinjecting the gas downstream, for example between the fifth valves 15 and the compressor 20.

Optionally, additional flow meters are disposed at the inlet of each buffer tank. Redundancy of measurement of liquid flow rate is ensured.

The capacity of the cryogenic storage device is between 10 kg and 10,000 kg of gas, preferably between 100 kg and 10,000 kg of gas.

A temporary-storage and gasification storage tank 7 is provided for the rise in pressure of the gas supplied by the device. An upstream valve 12 is designed to be open for the liquid flow during a phase of filling the temporary-storage storage tank 7 and closed outside the filling phase. At least one downstream valve 13, 15 is designed to be open for the gas flow during a phase of emptying the temporary-storage storage tank 7 and closed outside the emptying phase. The upstream valve and the downstream valve are closed during a gasification phase. The upstream valve and the downstream valve have all-or-nothing control. At least one compressor 20 is disposed downstream of the downstream valve 15. The compressor 20 is active at the end of the emptying phase to bring the pressure in the temporary-storage storage tank 7 to a value below the value of the pressure in the device. A pressure-reducing valve 9 is disposed downstream of the downstream valve. The pressure-reducing valve 9 is active at the start of the emptying phase to bring the pressure of the gas at the outlet to a value below the pressure in the temporary-storage storage tank 7.

The railway, road or maritime cryogenic gas-storage tank, spherical or elongate in shape, in particular about a longitudinal axis, comprises an inner container defining a liquefied-gas storage chamber 28, an outer envelope 27 containing the inner container and produced in several demountable parts allowing access to the inner container, the outer envelope 27 being produced from material withstanding temperatures of less than −60° C. to at least +80° C., an insulation chamber 29 defined between the inner container and the outer envelope, the insulation chamber 29 at reduced pressure having impermeability to helium equal to or better than $10^{-9}$ millibar*litre/second defined between the inner container and the outer envelope, two connections, at least one sliding, supporting the inner container and carried by the outer envelope, a support ring mounted between the inner container and the outer envelope at a distance from the connections in the insulation chamber, a removable collector 38 passing through the outer envelope and the inner container sealingly, and a thermally insulating flexible neck 42 forming a gastight interface between the collector 38 on the one hand and on the other hand the outer envelope and the inner container, the neck 42 being provided around a portion of the collector 38, the neck 42 passing through the insulation chamber to enable the collector 38 to be disassembled independently of the pressure in the insulation chamber.

The storage and distribution assembly comprises a hydrogen-storage cryogenic tank, comprising an inner container defining a liquefied-gas storage chamber, an outer envelope containing the inner container, a gastight insulation chamber defined between the inner container and the outer envelope, a removable liquefied-gas collector passing through the outer envelope and the inner container sealingly, the collector extending over a diameter or a diagonal of the inner container and having a free end adjacent to a bottom of the inner container, a liquefied-gas conduit supplied by the collector, a temporary storage tank forming a gasification member for the rise in pressure of the gas supplied by the device, an upstream valve designed to be open for the liquid flow during a phase of filling the temporary storage tank and closed outside the filling phase, a downstream valve designed to be open for the gas flow during a phase of emptying the temporary storage tank and closed outside the emptying phase, the upstream valve and the downstream valve being closed during a gasification phase, the upstream valve and the downstream valve having all-or-nothing control, and a pressure-reducing valve disposed downstream of the downstream valve, said pressure-reducing valve being active at the start of the emptying phase to bring the pressure of the gas at the outlet to a value lower than the pressure in the temporary storage tank.

The collector of the device is unsuitable for withstanding high pressures, in particular above 10 bars. The liquefied gas is substantially at the same pressure in the cryogenic tank, in particular in the tube 39 of the collector, and in the outlet conduit 4 during a transfer of liquefied gas. The liquefied gas is at the same pressure in the cryogenic tank, in particular in the tube 39 of the collector, and in the outlet conduit 4 outside a transfer of refined gas. The device has no pump. The liquefied gas can be decanted by pressure difference between the cryogenic tank and a downstream member.

The tube 39 can consist of a tube emerging in the outlet conduit 4.

Each temporary storage tank 7 forms a gasifier. Each temporary storage tank 7 forms a heat exchanger. Each temporary storage tank 7 forms a heat exchanger that comprises at least one cryogenic-liquid inlet and at least one gas outlet. The temporary storage tanks 7 have no thermal insulation. The temporary storage tanks 7 comprise a simple envelope. The temporary storage tanks 7 are metal and/or made from composite materials. The temporary storage tanks 7 are produced in whole or in part from conductive material. The temporary storage tanks 7 withstand cryogenic temperatures. The temporary storage tanks 7 withstand high service pressures compared with the low-pressure cryogenic tank. The temporary storage tanks 7 have a short storage life compared with the cryogenic tanks 2 with a long storage life.

Figure 9:
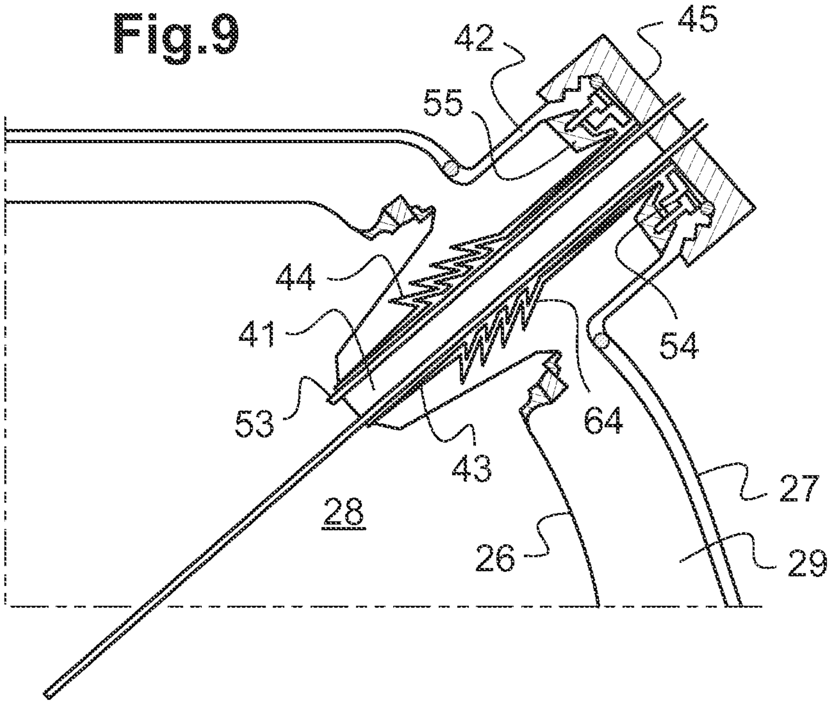
FIG. 9 illustrates schematically in cross section a neck and a collector according to another aspect of the invention.

In the embodiment in FIG. 9, the neck 42 has an external surface 44 with rounded annular waves 64. The external surface 44 is undulating. Compared with FIG. 7, the developed length of the waves 64 is greater than that of the chevrons, and hence better insulation by elongation of the conduction path.

Figure 10:
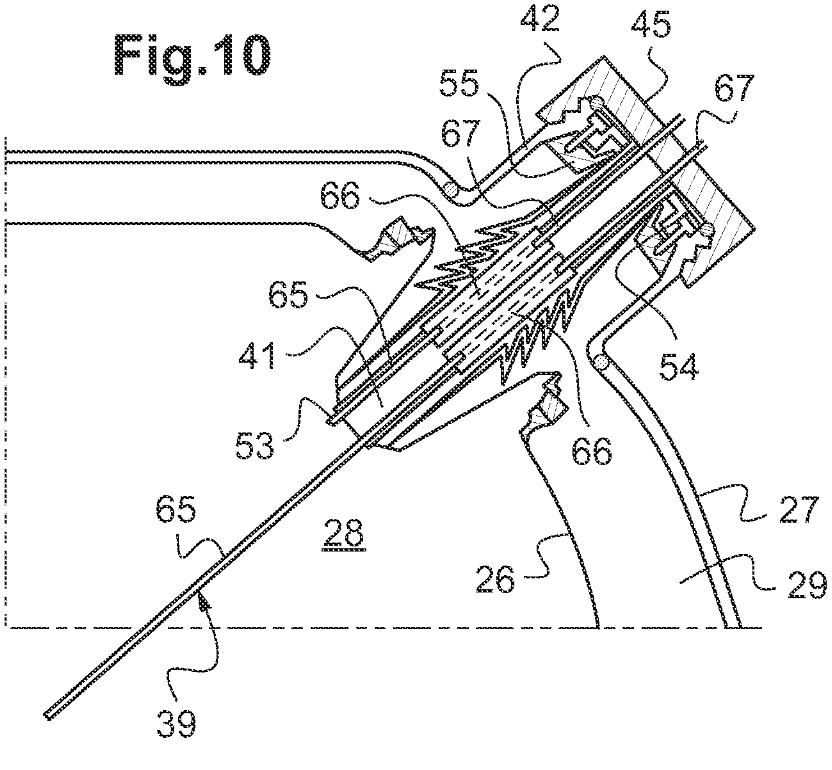
FIG. 10 illustrates schematically in cross section a neck and a collector according to another aspect of the invention.

In the embodiment in FIG. 10, the tube 49 is produced in several parts forming together a tube for taking off liquefied gas. The tube 39 comprises a bottom part 65 disposed mainly in the storage chamber 28, an intermediate sleeve 66 disposed in the plug 41, and a top part 67 towards the outside. The bottom part 65 is formed by a metal conduit, for example made from stainless steel. The bottom part 65 is inserted in the plug 41 through a top end. The top part 67 is formed by a metal conduit, for example made from stainless steel. The top part 67 is inserted in the plug 41 through a bottom end. The bottom part 65 is distant from the top part 67. The intermediate sleeve 66 is contained in the plug 41. The intermediate sleeve 66 is produced from material having thermal conduction lower than the thermal conduction of the bottom part 65 and lower than the thermal conduction of the top part 67. The intermediate sleeve 66 can be produced from resin withstanding cryogenic temperatures, for example epoxy. The intermediate sleeve 66 surrounds the top end of the bottom part 65. The intermediate sleeve 66 surrounds the bottom end of the top part 67. The thermal losses are low.

The pipe of the vent 53 is produced in a similar manner to the tube 39 in several parts having different thermal properties, in particular in conduction, for low thermal losses. The bottom part 65 of the pipe of the vent 53 has a length less than the length of the bottom part 65 of the tube 39. The intermediate sleeve 66 of the pipe of the vent 53 can be identical to the intermediate sleeve 66 of the tube 39. The top part 67 of the pipe of the vent 53 can be identical to the top part 67 of the tube 39.

The annular chevrons have an angle with respect to a radial plane smaller than on FIG. 6. Thus the angle of the annular chevrons with respect to a radial plane is less than 45°. Said angle can be between 5 and 30°. The annular chevrons have branches undulating around a conical base form. The conduction path is extended. In a variant, symmetrical chevrons forming teeth 44 as on FIG. 6 or an undulating surface as on FIG. 9 are also provided.

The invention claimed is:

1. An aeronautical cryogenic tank device for storing gas, installed on board, with an elongate shape with rounded ends, rounded, spherical or annular about an axis, comprising an inner container defining a liquefied-gas storage chamber, an outer envelope containing the inner container, an insulation chamber defined between the inner container and the outer envelope, the insulation chamber having sealing equal to or better than 10-9 millibar*litre/second, a removable collector passing through the outer envelope and the inner container in a sealed manner, the collector extending over a diameter or a diagonal of the inner container and having a free end close to a bottom of the inner container, and a conduit supplied by the collector, the device comprising a thermally insulating flexible neck forming a gastight interface between the collector on the one hand and on the other hand the outer envelope and the inner container, the neck being provided around a portion of the collector, the neck passing through the insulation chamber to enable the collector to be disassembled independently of a pressure in the insulation chamber.

2. The device according to claim 1, comprising a thermally insulating plug assembly mounted removably on the collector and accessible from the outside.

3. The device according to claim 1, comprising a support ring mounted between the inner container and the outer envelope.

4. The device according to claim 1, comprising a connection comprising an axial concavity in the outer envelope receiving and supporting an axial projection of the inner container, and the device comprises housings supporting the outer envelope and surrounding said connections.

5. The device according to claim 1, wherein the neck has an external surface with annular chevrons.

6. Device according to claim 1, wherein the neck has an undulating external surface.

7. The device according to claim 1, wherein the outer envelope comprises a chassis, sealed panels, gaskets withstanding the pressure between the chassis and the panels or between the panels, the chassis comprising ribs and longitudinal members.

8. The device according to claim 1, comprising an anti-sway member inside the inner container and a stiffener inside the inner container.

9. The device according to claim 1, wherein a hydrogen-absorbent material is disposed in the insulation chamber, and a hydrogen-presence detector is installed in the insulation chamber.

10. An assembly comprising a device according to claim 1, a temporary storage tank forming a gasification member for a pressure rise of the gas supplied by the device, an upstream valve designed to be open for liquid flow during a phase of filling the temporary storage tank and closed outside the filling phase, a downstream valve being designed to be open for the gas flow during the phase of emptying the temporary storage tank and closed outside the emptying phase, the upstream valve and the downstream valve being closed during a gasification phase, the upstream valve and the downstream valve having all-or-nothing control, and a compressor disposed downstream of the downstream valve, said compressor being active at the end of the emptying phase to bring the pressure in the temporary storage tank to a value lower than the value of the pressure in the device, and a pressure-reducing valve disposed downstream of the downstream valve, said pressure-reducing valve being active at a start of the emptying phase to bring the pressure of the gas at an outlet to a value lower than the pressure in the temporary storage tank.

11. The device according to claim 1, wherein the outer envelope comprises a chassis, sealed panels, gaskets withstanding the pressure between the chassis and the panels and between the panels, the chassis comprising ribs and longitudinal members.

12. The device according to claim 1, comprising an anti-sway member inside the inner container and a stiffener inside the inner container, wherein the anti-sway member comprises a strut or a tie rod.

* * * * *